US010295113B1

(12) United States Patent
Fox

(10) Patent No.: US 10,295,113 B1
(45) Date of Patent: May 21, 2019

(54) WHEELED STAND

(71) Applicant: VIS, LLC, Travelers Rest, SC (US)

(72) Inventor: Robert Fox, Greenville, SC (US)

(73) Assignee: VIS, LLC, Travelers Rest, SC (US)

( * ) Notice: Subject to any disclaimer, the term of this patent is extended or adjusted under 35 U.S.C. 154(b) by 0 days.

(21) Appl. No.: 15/967,954

(22) Filed: May 1, 2018

(51) Int. Cl.
  *F16M 13/00* (2006.01)
  *F16M 11/42* (2006.01)

(52) U.S. Cl.
  CPC ......... *F16M 11/42* (2013.01); *F16M 2200/08* (2013.01)

(58) Field of Classification Search
  CPC .......................... F16M 11/42; B62B 2202/02
  USPC .................................................. 248/129, 424
  See application file for complete search history.

(56) References Cited

U.S. PATENT DOCUMENTS

D798,521 S * 9/2017 Huddy ........................... D34/23
2008/0283692 A1* 11/2008 Leinen ................ A61M 5/1415
  248/125.8

* cited by examiner

*Primary Examiner* — Todd M Epps
(74) *Attorney, Agent, or Firm* — J. Bennett Mullinax, LLC

(57) ABSTRACT

A wheeled support stand with a recessed tray for supporting a vertical upright member is provided.

4 Claims, 9 Drawing Sheets

WHEELED STAND

RELATED APPLICATIONS

This application claims the benefit of U.S. application Ser. No. 29/636,942 filed on Feb. 13, 2018; U.S. application Ser. No. 29/636,947 filed on Feb. 13, 2018; and U.S. application Ser. No. 29/636,950 filed on Feb. 13, 2018 and which are all incorporated herein by reference.

FIELD OF THE INVENTION

This invention is directed towards a wheeled support stand for automotive lifting equipment and similar mechanical needs where a stable, wheeled base stand can receive one or more vertical uprights having a variety of utilitarian uses. Such equipment is heavy, requires a wheeled base for mobility, and must offer strength and a stable footprint that allows for a heavy load to be engaged and supported without tipping. Further, the field of the invention is directed towards a mobile base that defines a tray receiving area that can support multiple models and various types of vertically positioned equipment such as transmission jacks.

BACKGROUND OF THE INVENTION

There are a wide number of wheeled support stands in the art that are utilized in automotive shop environments, industrial applications, and in specialized niched areas such as support for hospital equipment, industrial studio lighting, and commercial photography applications. Many applications require a support stand that can engage a heavy load in a position six feet or greater above a floor surface. The demands on a wheeled stand are increased in such conditions in terms of having a durable product that can engage and support heavy loads and can transport heavy loads while the supported equipment is in an elevated position. Accordingly, there remains room for variation and improvement within the art.

SUMMARY OF THE INVENTION

It is one aspect of at least one of the present embodiments to provide for a wheeled equipment stand comprising a first leg opposite a second leg, the second leg being a mirror image of the first leg; a third leg opposite a fourth leg, the third leg and fourth leg being mirror images thereof and the first and second leg defining a first common axis which is at a right angle to a second common axis defined by the third and fourth leg;

each of the first, second, third, and fourth legs defining an upper surface and a pair of opposing side walls, the sidewalls extending below the upper surface, the upper surface and pair of opposing sidewalls defining a cavity there between, each of the respective legs having a reduced width taper as the leg extend away from the opposite leg; a rectangular tray defining an interior tray volume, each corner of the rectangular tray being mounted substantially flush along the upper edge surface of the corresponding leg, each corner further centered along an axis defined by the corresponding leg; a bottom of the tray being substantially co-planar with the lower edges of the leg edge sidewalls the tray further being engaged by a first end of each leg which engages the tray sidewalls in a non-perpendicular angle extending from an upper surface of the leg to a bottom edge of the tray sidewall;

a wheel assembly attached to a second end of each leg, the wheel assembly further defining an upwardly extending angled plate having a wheel attached to a lower surface of the angled plate.

The equipment support stand may further define a spring biased cover plate is frictionally engaged to the interior edge walls of the tray These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Figure 1:
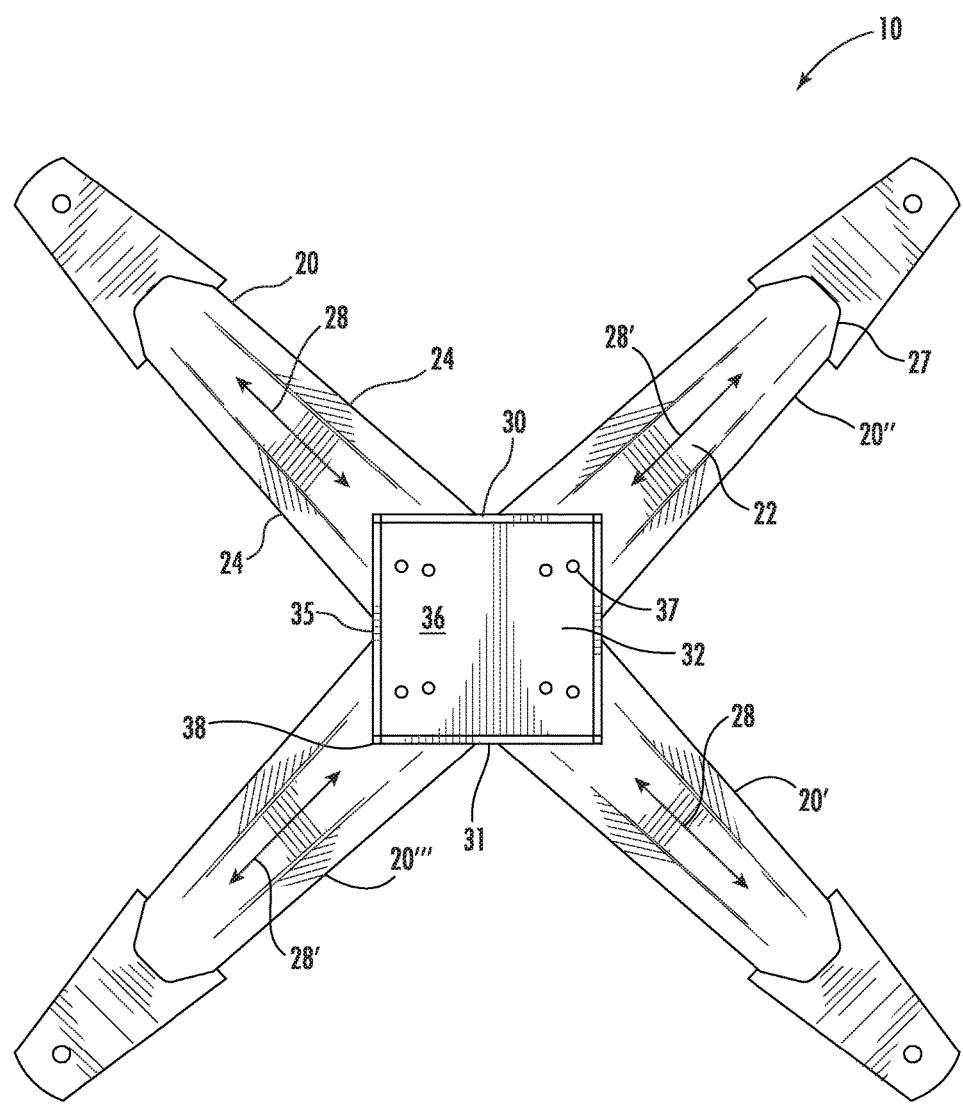
FIG. 1 is a top view of one embodiment of the present invention.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

A wheeled equipment stand 10 is illustrated in FIGS. 1-4 and 9. The equipment stand has a first leg 20 opposite a second leg 20', the second leg 20' being a mirror image of the first leg 20; a third leg 20" opposite a fourth leg 20''', the third leg 20" and fourth leg 20''' being mirror images thereof and the first and second legs defining a first common axis 28 which is at a right angle to a second common axis 28' defined by the third and fourth leg.

Each of the first, second, third, and fourth legs define an upper surface 22 and a pair of opposing sidewalls 24, the sidewalls 24 extending below the upper surface 22, the upper surface 22 and pair of opposing sidewalls 24 further defining a cavity 26 there-between, each of the respective legs 20, 20', 20" and 20''' having a reduced width taper as the leg extends away from the opposite leg.

Figure 2:
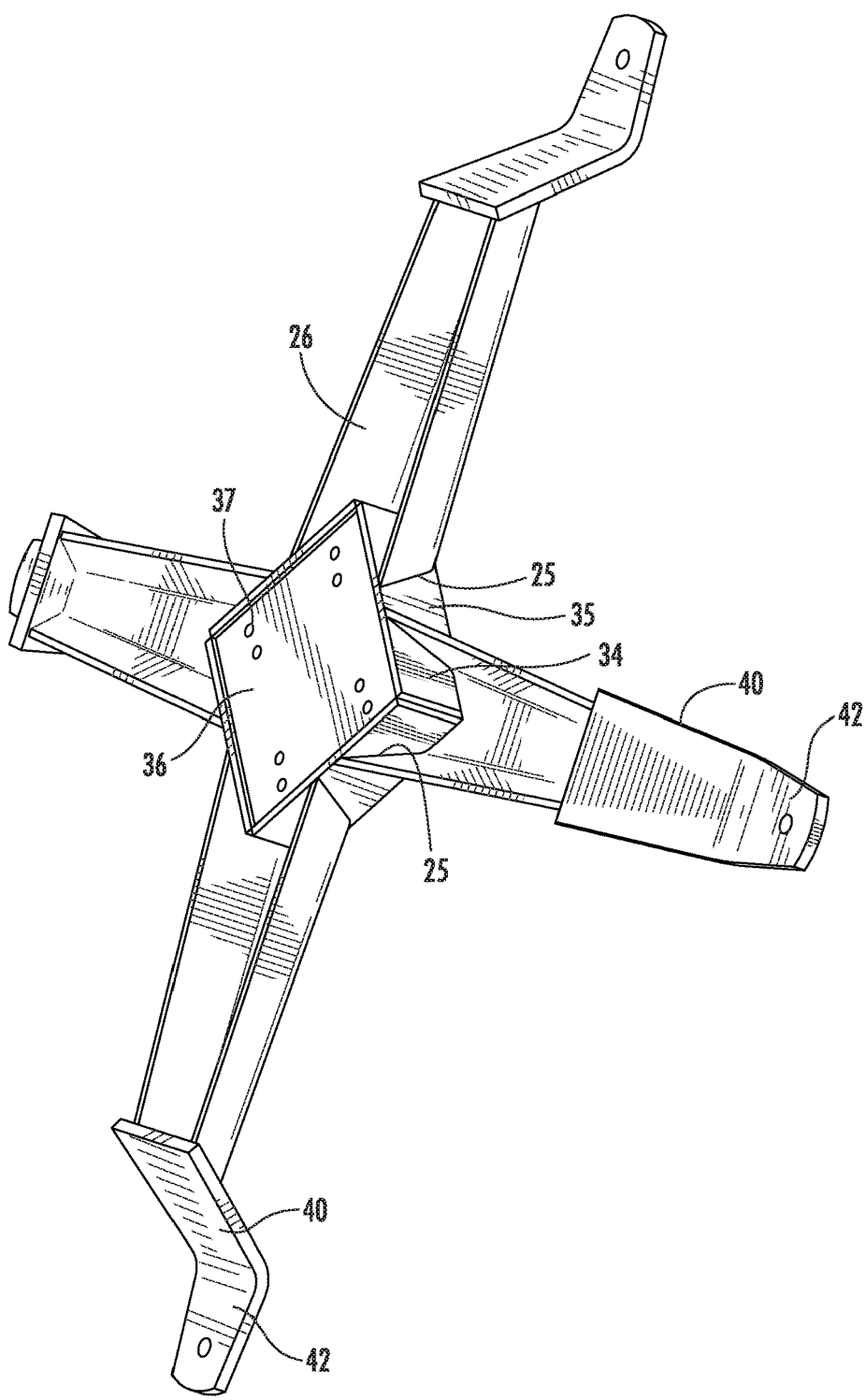
FIG. 2 is a bottom perspective view of the embodiment seen in FIG. 1.
Figure 3:
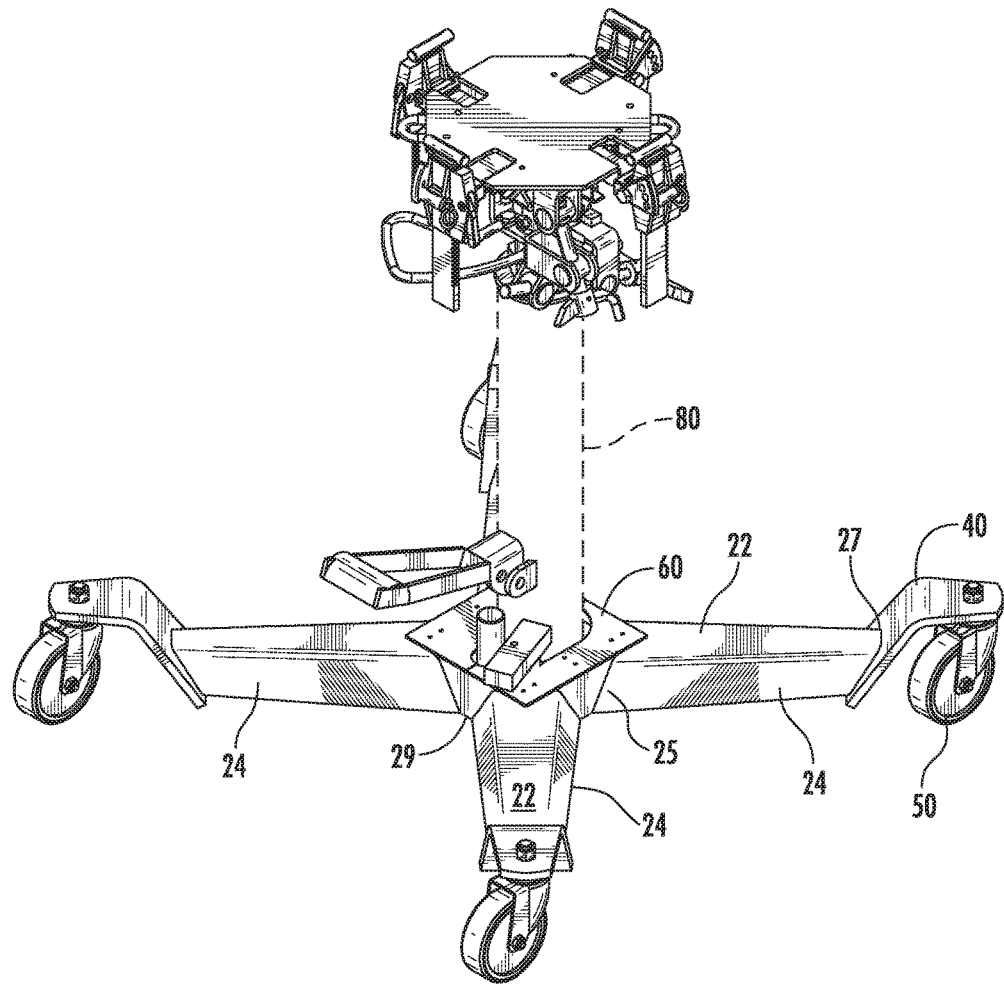
FIG. 3 is a side view of an embodiment of the invention similar to FIG. 1 but illustrating additional features of the invention and as seen in reference to a supported upright structure.
Figure 4:
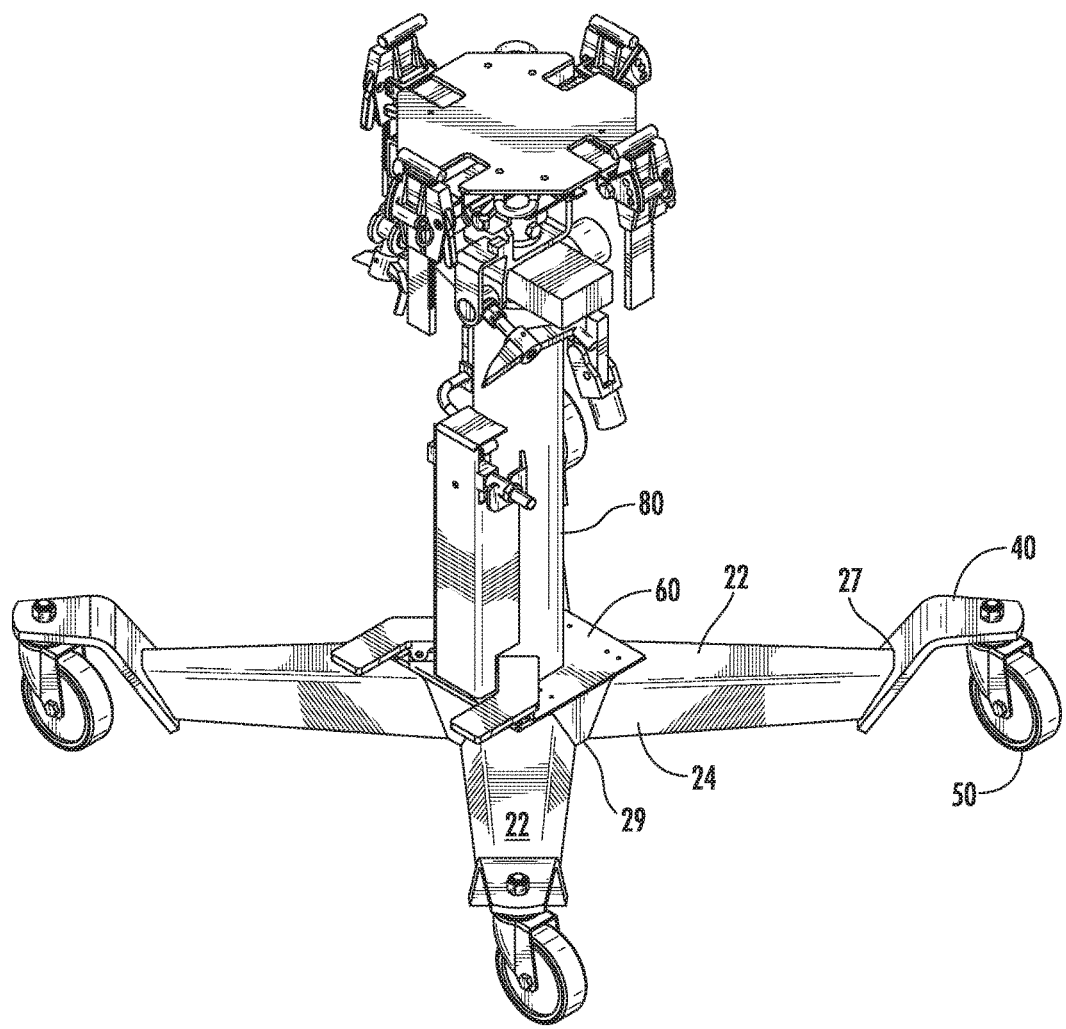
FIG. 4 is an alternative embodiment of the present invention as seen in reference to a supported structure.
Figure 5:
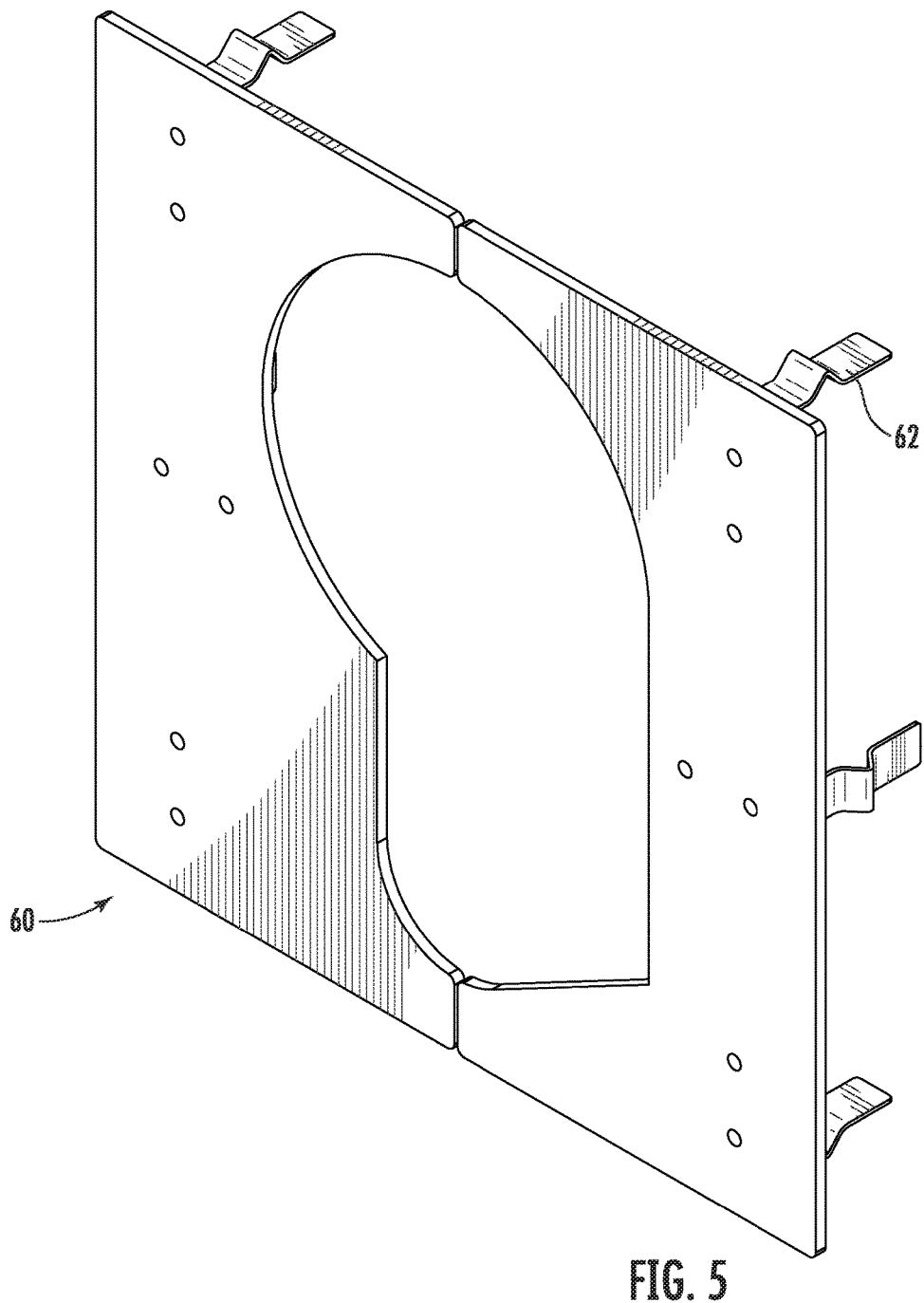
FIG. 5 is a top perspective view of a cover plate that can be used with one or more embodiments of the present invention.
Figure 6:
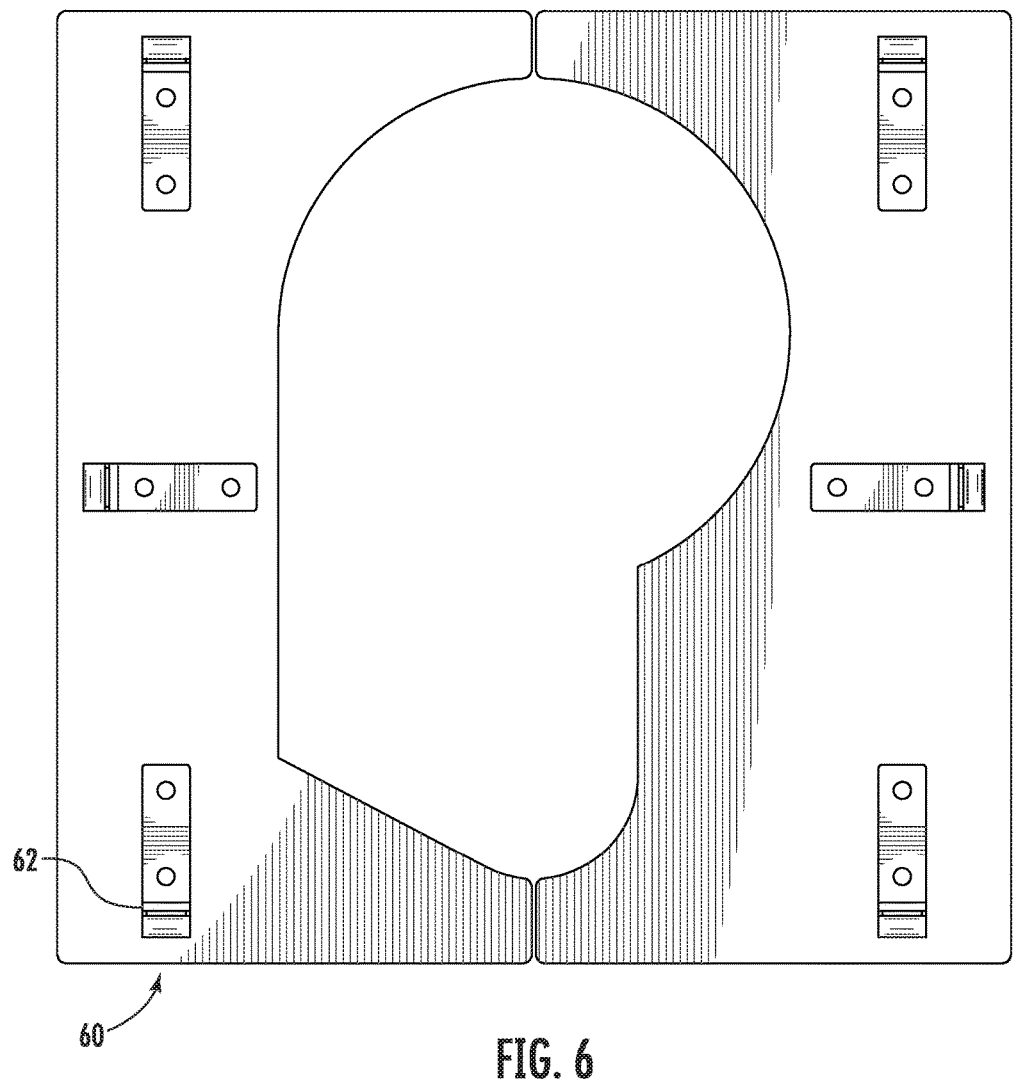
FIG. 6 is a bottom view of the cover plate seen in FIG. 5.
Figure 7:
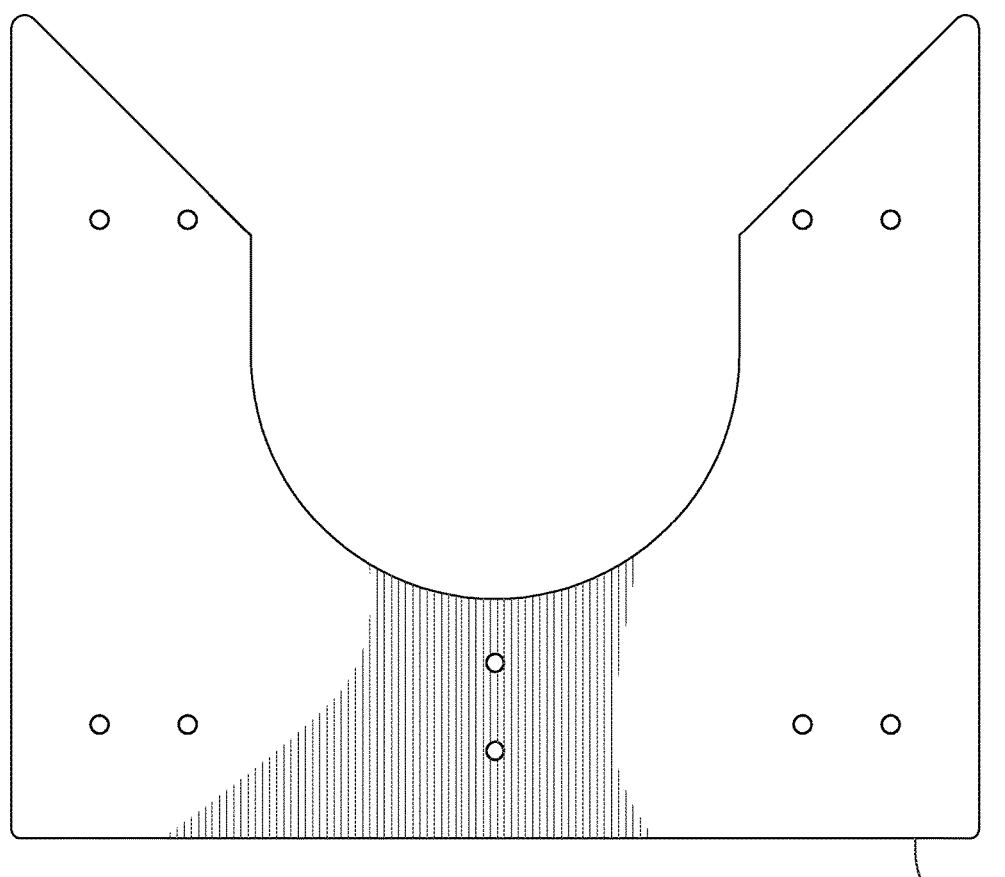
FIG. 7 is an alternative embodiment of a top view of a cover plate that can be used with one or more of the embodiments of the present invention.
Figure 8:
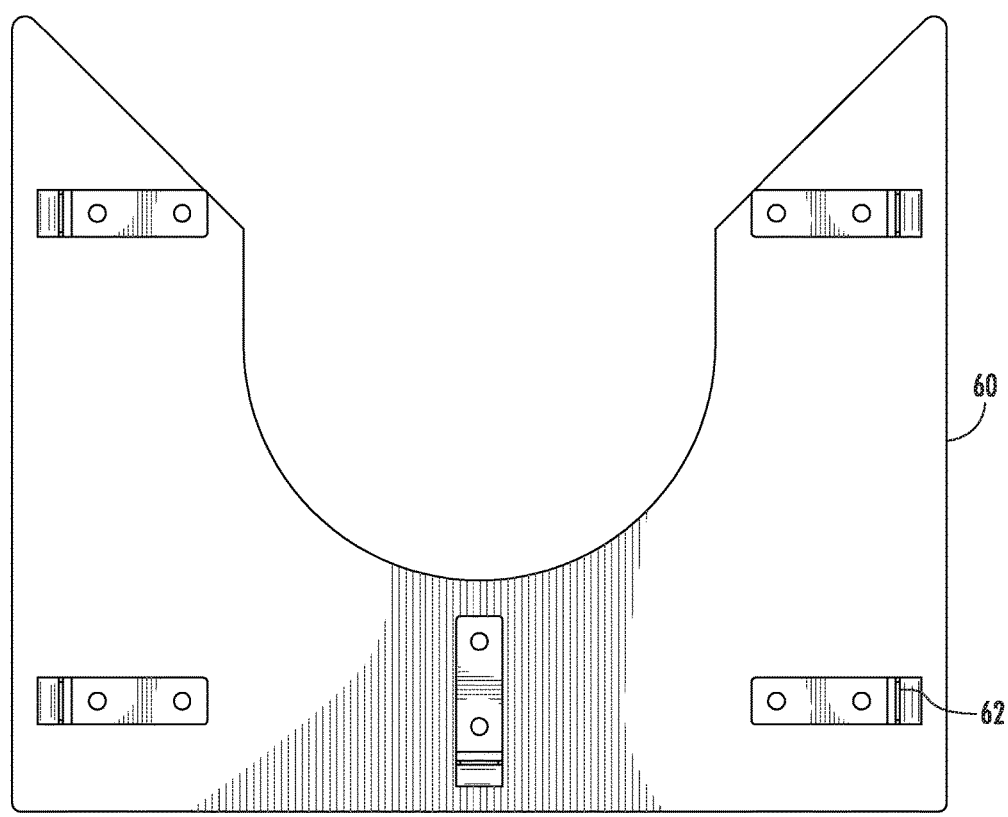
FIG. 8 is a bottom view of the cover plate seen in FIG. 7.
Figure 9:
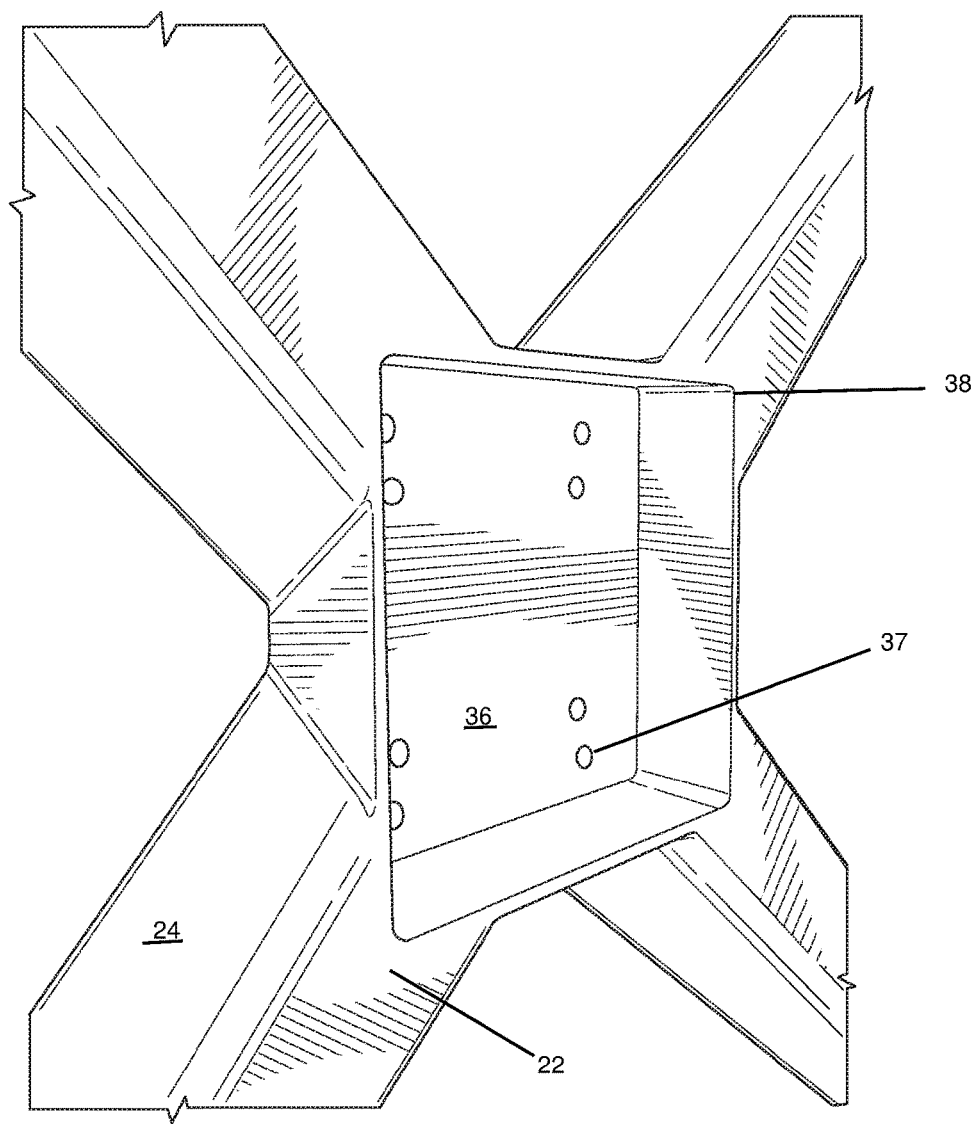
FIG. 9 is a top perspective view setting forth details of the construction of the tray manual flush with the legs.

As best seen in the FIGS. 1, 2 and 9, a rectangular tray 30 defines an interior tray volume 32. An upper tray edge defines a flange 31 that extends outwardly along the upper tray margin. Each corner 38 of the rectangular tray 30 is mounted substantially flush along the upper edge surface 22 of the corresponding leg, each corner 38 further centered along an axis 28 or 28' defined by the respective corresponding leg. A bottom 36 of the tray is substantially co-planar with the lower edges of the leg edge sidewalls 24, the tray 30 further being engaged by a first end 25 of each leg 20 which engages the tray sidewalls 35 in a non-perpendicular angle and extending from an upper surface 22 of the respective leg to 20 of a lower edge of the tray sidewall 35. A gap 29 is defined between the adjacent legs and a lower edge wall of the tray 30.

As further seen in reference to FIG. 9, the flanges 31 which extend outwardly from the upper tray margin are preferably welded such that the tray edges form a substantially seamless smooth junction with the corresponding adjacent portions of the upper leg edge surfaces 22. The welded seams provide a smooth transition between the tray and the legs and in part a strong, forced distributing attachment between the respective parts. As further seen in reference to FIG. 2, edges 38 of tray 30 extend into the open channels cavity 26 formed within the underside of each leg 20, 20', 20" and 20'''.

A wheel assembly is attached to a second end 27 of each leg, the wheel assembly further defining an upperwardly extending angled plate 40 having a wheel 50 attached to a lower surface 42 of the angled plate 40.

The equipment support stand 10 may further include a spring biased cover plate 60 that is frictionally engaged by clips 62 to the interior edge walls of the tray as seen in reference to FIGS. 5-8. The plate 60 helps prevent debris from collecting from within the tray interior.

The tray bottom 36 defines therein a plurality of openings 37 that can be used to secure a support stand or lifting apparatus 80 via any number of conventional fasteners. The tray cavity allows for a lower center of gravity for stabilizing a vertical upright structure. The placement of the tray 30, relative to the legs, allows for additional strength by reinforcing the tray corners along the axis of the respective legs.

The position of the tray corners along the leg axis allows the area between the legs to be unobstructed so that operating pedals and various mechanical of a lifting apparatus can be used without obstruction by the stand.

The attachment of the legs to the sidewall of the tray also provides for additional strength. The smooth upper surface of the legs and the smooth attachment of the tray to the legs facilitates the use of pneumatic hoses, power cords, and similar objects which could be otherwise damaged or entangled on a non-smooth surface. In one preferred embodiment, the components of the tray, legs, and wheel assembly plate are permanently joined together by welding.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A wheeled equipment stand comprising:
   a first leg opposite a second leg, the second leg being a mirror image of the first leg;
   a third leg opposite a fourth leg, the third leg and fourth leg being mirror images thereof and the first and second legs defining a first common axis which is at a right angle to a second common axis defined by the third and fourth legs;
   each of the first, second, third, and fourth legs defining an upper surface and a pair of opposing sidewalls, the sidewalls extending below the upper surface, the upper surface and pair of opposing sidewalls defining a cavity there between, each of the respective legs having a reduced width taper as the leg extends away from an opposite leg;
   a rectangular tray defining an interior tray volume, each corner of the rectangular tray being mounted substantially flush along the upper edge surface of the corresponding leg, the tray further centered along an axis defined by the corresponding leg; a bottom of the tray being substantially co-planar with lower edges of leg edge sidewalls the tray further being engaged by a first end of each leg which engages tray sidewalls in a non-perpendicular angle extending from an upper surface of the leg to a bottom edge of the tray sidewall;
   a wheel assembly attached to a second end of each leg, the wheel assembly further defining an upperwardly extending angled plate having a wheel attached to a lower surface of the angled plate.

2. The equipment support stand according to claim 1 wherein a spring biased cover plate is frictionally engaged to interior edge walls of the tray.

3. The wheeled equipment stand according to claim 1 wherein the upper surface of the first leg, second leg, third leg, and fourth leg are positioned below a plane defined by the lower surface of the angled plate.

4. The wheeled equipment stand according to claim 1 wherein there is a gap defined along a lower edge wall of the tray between the respective edge walls of adjacent legs secured to the tray.

* * * * *